US010304318B1

(12) United States Patent
Xu et al.

(10) Patent No.: US 10,304,318 B1
(45) Date of Patent: May 28, 2019

(54) ANTI-MASKING ASSEMBLY FOR INTRUSION DETECTOR AND METHOD OF DETECTING APPLICATION OF A MASKING SUBSTANCE

(71) Applicant: Honeywell International Inc., Morristown, NJ (US)

(72) Inventors: Haidong Xu, Shenzhen (CN); Xuanjiao Li, Shenzhen (CN); Guobin Xu, Shenzhen (CN); Ning Zhang, Shenzhen (CN); Zhongying Huang, Shenzhen (CN)

(73) Assignee: ADEMCO INC., Golden Valley, MN (US)

( * ) Notice: Subject to any disclaimer, the term of this patent is extended or adjusted under 35 U.S.C. 154(b) by 0 days.

(21) Appl. No.: 15/925,300

(22) Filed: Mar. 19, 2018

(51) Int. Cl.
*G08B 13/193* (2006.01)
*G08B 13/186* (2006.01)
*G08B 29/04* (2006.01)
*G08B 13/19* (2006.01)
*G02B 3/00* (2006.01)
*G02B 3/08* (2006.01)
*G05B 15/02* (2006.01)
*G06F 3/01* (2006.01)

(52) U.S. Cl.
CPC ......... *G08B 29/046* (2013.01); *G08B 13/186* (2013.01); *G08B 13/19* (2013.01); *G08B 13/193* (2013.01); *G02B 3/0043* (2013.01); *G02B 3/08* (2013.01); *G05B 15/02* (2013.01); *G06F 3/017* (2013.01)

(58) Field of Classification Search
None
See application file for complete search history.

(56) References Cited

U.S. PATENT DOCUMENTS 6,469,625 B1 * 10/2002 Tomooka ............. G08B 29/046
250/342
7,875,852 B2 * 1/2011 Zhevelev ............. G01J 5/0022
250/332
2007/0152156 A1 * 7/2007 Zhevelev ................. G01J 5/08
250/339.14

(Continued)

FOREIGN PATENT DOCUMENTS

EP 1126430 A2 * 8/2001 ............. G08B 13/19
WO WO 2006107203 A1 * 10/2006 ........... G08B 29/046

*Primary Examiner* — Steven Lim
*Assistant Examiner* — Muhammad Adnan
(74) *Attorney, Agent, or Firm* — Husch Blackwell LLP

(57) ABSTRACT

An anti-masking device for an intrusion detector and method for detecting a masking substance is disclosed. The device can comprise a cover enclosing an interior area housing an electric light source and a light detecting sensor. The cover can have a light-permeable area having an exterior surface with a jagged array including a plurality of parallel spaced-apart teeth forming a series of alternating channels and projections. A light guide can be provided with opposing first and second ends. The first end can be located within the interior area adjacent the light source and the second end can be located adjacent the exterior surface of the cover. The light guide can be configured to direct light outside the cover and onto the jagged array. The jagged area can be configured to refract light from the light guide through the cover and into the interior.

18 Claims, 12 Drawing Sheets

(56) References Cited

U.S. PATENT DOCUMENTS

| | | | |
|---|---|---|---|
| 2007/0290122 A1* | 12/2007 | Wipiejewski | G08B 13/19 250/221 |
| 2009/0027574 A1* | 1/2009 | Edwards | G08B 13/193 349/1 |
| 2009/0039296 A1* | 2/2009 | Richard | G01F 23/2925 250/576 |
| 2009/0127465 A1* | 5/2009 | Richard | G08B 29/046 250/343 |
| 2013/0240739 A1* | 9/2013 | Shpater | G08B 29/046 250/353 |
| 2015/0168931 A1* | 6/2015 | Jin | H04L 12/12 700/90 |
| 2016/0344950 A1* | 11/2016 | Slaby | H04N 5/33 |

\* cited by examiner (prior art - test without mask (Max: 1:17V))

(prior art - test with mask material (Max: 1:17V))

(Prior art - test without mask material (Min: 940mV))

(Prior art - test with mask material (Min: 940mV))

ANTI-MASKING ASSEMBLY FOR INTRUSION DETECTOR AND METHOD OF DETECTING APPLICATION OF A MASKING SUBSTANCE

FIELD

Embodiments presented herein relate generally to detectors used with security or intrusion detection systems, and more particularly to detectors having anti-masking capabilities to detect the application of a masking substance to the cover of the detector to disable detection capability.

BACKGROUND

It is generally well-known that older-model intrusion detector devices could be readily disabled by applying a masking substance, such as, for example, a spray, film, lacquer or opaque sheet over the detector to block the sensor's field of view and prevent it from detecting conditions associated with an unauthorized security breach. For this reason, developers of security devices have been motivated to devise and implement intrusion detectors with anti-mask detection capabilities. Such known anti-mask technologies generally detect when a masking substance has been applied to the detector by either sensing changes in reflectivity or transmittance of light directed at the optical lens or window of the detector.

FIGS. 1A-B and 2A-B illustrate known anti-mask solutions associated with conventional intrusion detectors. In particular, FIGS. 1A and 1B illustrate a detector incorporating mask detection capability by detecting a change in transmittance of light across the lens. The detector illustrated in FIGS. 1A and 1B is shown as having an emitter and detector. In FIG. 1A, the detector is shown in an ordinary condition of use (whereby the detector is operating as designed/intended and capable of detecting/monitoring a designated area). As shown schematically in FIG. 1A, according to existing technologiesan emitter can emit a light across the face of the optical lens and the detector is programmed to detect a baseline transmittance of the light. FIG. 1B illustrates a condition whereby a liquid masking agent such as a spray has been applied across the exterior surface of the lens. According to such a condition, the absorption of the masking agent can reduce the transmittance of the light. The detector is intended to sense this change in transmittance and signal an alarm that the detector has been disabled.

FIGS. 2A and 2B illustrate a conventional detector incorporating mask detection capability through detection of a change in reflectivity of light projected at the lens. The detector of FIGS. 2A and 2B is generally shown as having an internal emitter and detector below (i.e. inside) the lens with the emitter emitting light energy at the lens, the lens (which is typically made of a semi-reflective material) is intended to reflect at least a portion of the light energy back towards the detector. FIG. 2A illustrates a detector in an ordinary condition of use where the detector is programmed to detect a baseline signal from reflection off the interior (A) and exterior (B) surfaces of the lens. FIG. 2B illustrates a condition whereby a liquid masking agent such as a spray has been applied across the exterior surface of the lens. According to such a condition, the reflection of light off the exterior surface of the lens (B) can be reduced, with the detector intended to sense reflection off the masking agent on the exterior surface of the lens (D).

Conventional mask detection technology of the type illustrated in FIGS. 1A-B and 2A-B have a number of limitations. For example, it is generally known that the mask detection capabilities of such devices can be compromised or defeated with the use of a thin, high transmittance and/or low reflectivity masking agent which makes changes to transmittance or reflectivity difficult to detect. Examples of such masking agents can include colorless plastic skins or spray polyurethanes and/or brush-applied clear gloss lacquer. Certifying bodies and/or agencies for intrusion detectors have come to recognize that conventional technologies have difficulty detecting such masking materials and have incorporated detection requirements for such materials as part of the certification evaluation (including, for example certifications for EN-G3 and VDS-Class C standards). In particular, in order for a detector to pass the EN-G3 certification, it must be able to reliably detect the following seven kinds of masking materials:

| number | Material |
|---|---|
| 1. | Matt black paper sheet |
| 2. | 2 mm thick aluminum sheet |
| 3. | 3 mm thick clear gloss acrylic sheet |
| 4. | White polystyrene foam sheet |
| 5. | Self adhesive clear vinyl sheet |
| 6. | Colourless plastic skin, spray polyurethane |
| 7. | Clear gloss lacquer, brush applied |

As noted above, detection tests of masking substances 6 and 7 listed above can prove to be especially difficult for conventional detectors to pass on account of known limitations with transmittance change detection or reflectivity change detection. This difficulty is corroborated by tests carried out by Applicant on some of the leading anti-mask intrusion detectors on the market. Specifically, FIGS. 3A-3D show graphical views of a detected signal from an evaluation of a detector in both an ordinary unmasked state (FIGS. 3A and 3C) and in a condition where the detector was masked with a colorless plastic skin/spray polyurethane masking agent (category No. 6 of the EN-G3 certification test) (see FIGS. 3B and 3D). Although this detector registered a pass of the EN-G3 certification test for category 6, the fact that the resulting signals from the masked condition (FIGS. 3B and 3D) are very similar to the signals from the unmasked state (FIGS. 3A and 3C) demonstrates that the masked condition is difficult for the detector to distinguish and/or register.

Some known detectors look to overcome such limitations by incorporating multiple light emitters and multiple receivers to enhance detection of changes in transmittance and reflection (one known detector assembly using as many as four infrared emitters and three infrared photodiode sensors). However, such designs are generally regarded as being more costly from both a materials and manufacturing perspective and more susceptible to failure should one of the emitters/sensors fail or malfunction.

Based on the foregoing, there is a need in the art for a new type of anti-masking device that can detect thin, high transmittance, and low reflectivity masking agents such as colorless plastic skins, spray polyurethanes and brush-applied clear gloss lacquers which have proven to be difficult to detect for conventional anti-mask detectors. There is further a need in the art for incorporating such anti-mask capability into an intrusion detector and that such capability be cost-effective and able to reliably meet relevant industry requirements and standards (e.g. EN-G3 and VDS-Class C). There is further a need in the art for a new method for detecting the application of a high transmittance, low reflectivity masking agent to a detector to address limitations of know detector technologies.

DETAILED DESCRIPTION

Figure 1A:
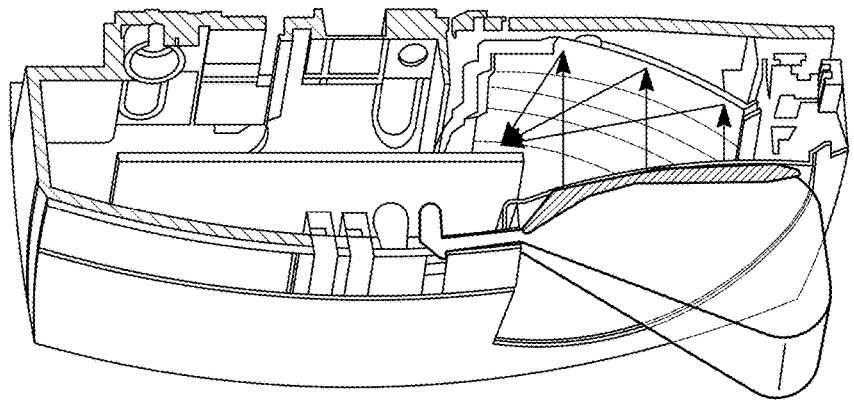
FIGS. 1A and 1B are schematic perspective cutaway views of conventional intrusion detector implementing a generally known transmittance change mask detection technique.
Figure 1B:
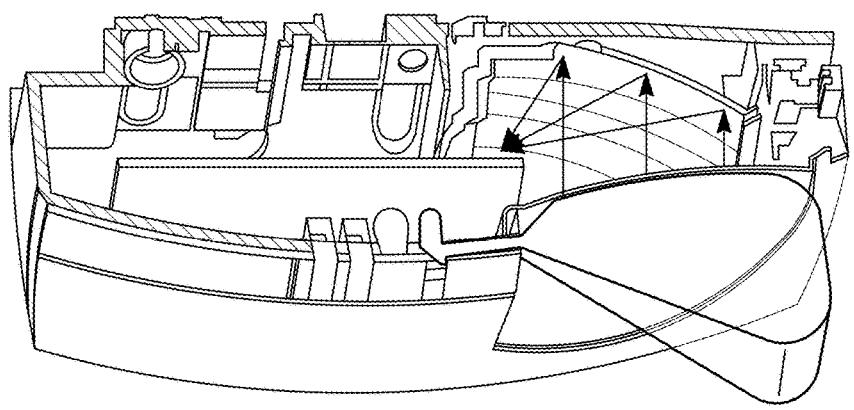
Figure 2B:
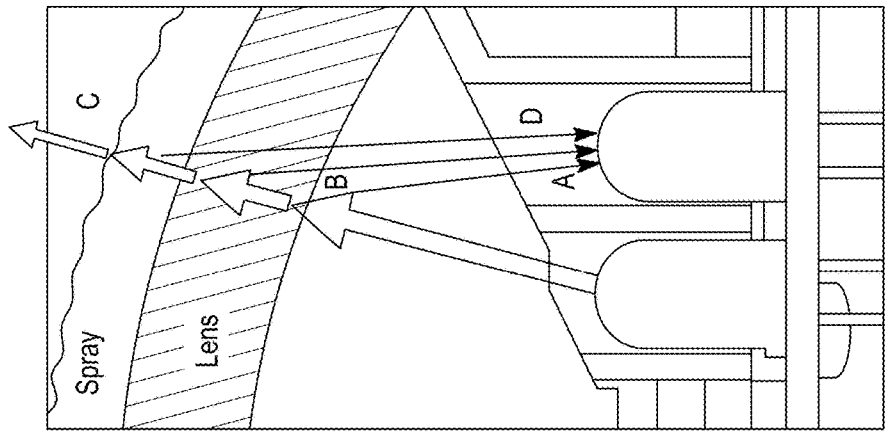
FIGS. 2A and 2B are schematic side representational views of a conventional intrusion detector implementing a generally known reflection change mask detection technique.
Figure 2A:
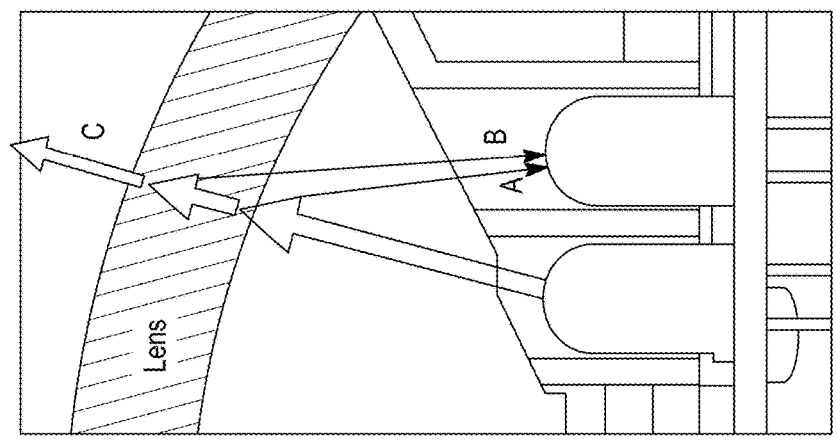
Figure 3A:
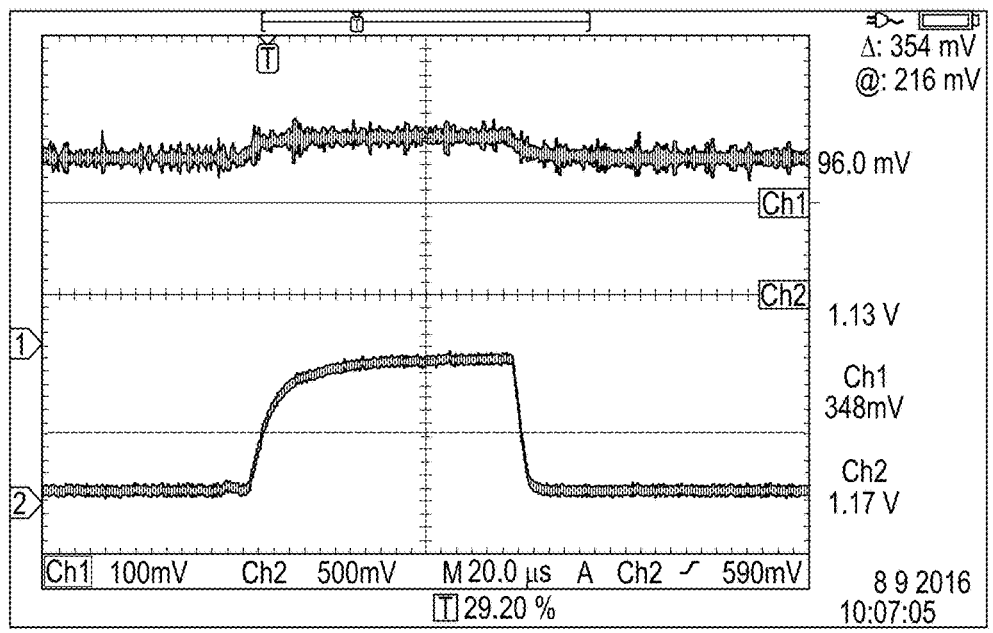
FIGS. 3A to 3D are graphical views of signal tests carried out on a conventional intrusion detector.
Figure 3B:
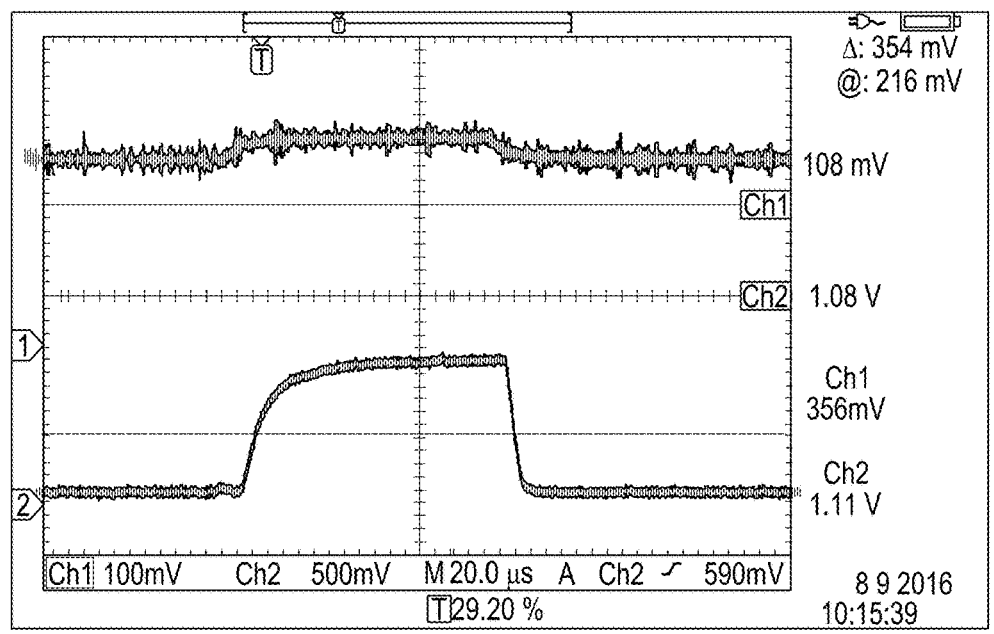
Figure 3C:
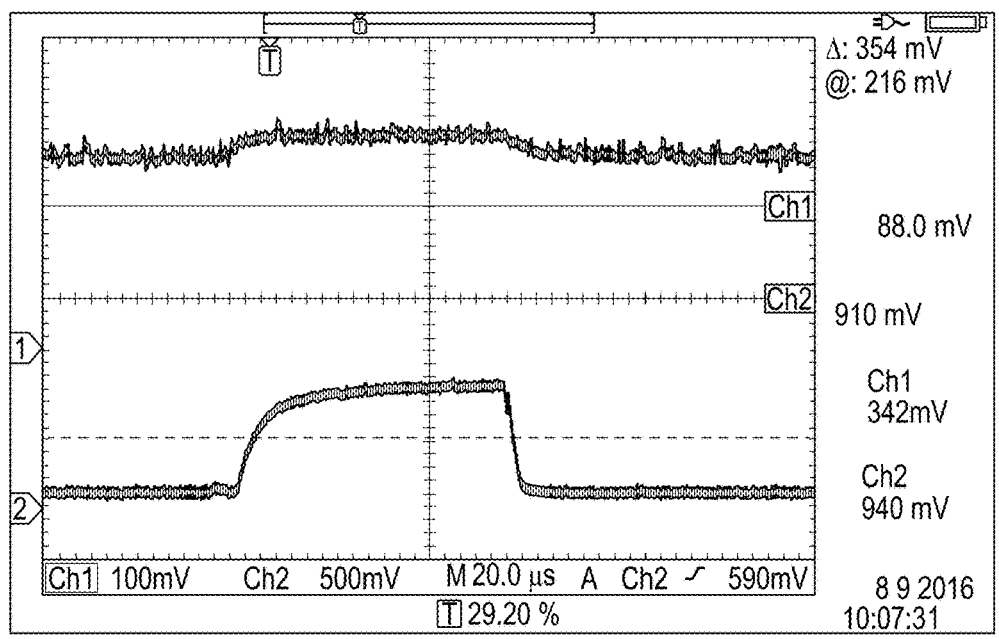
Figure 3D:
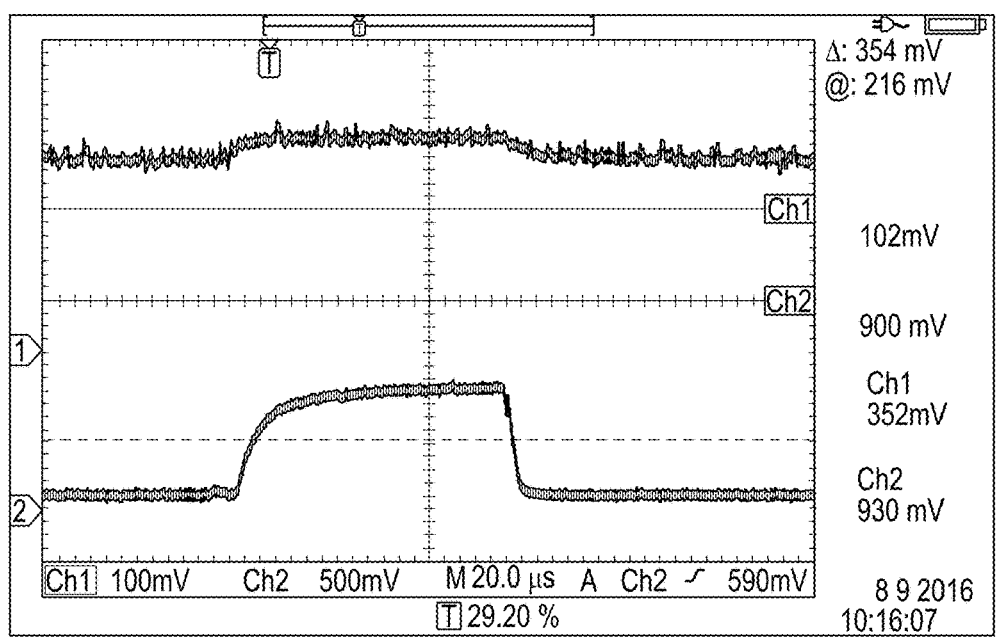

While the subject invention is susceptible of embodiment in many different forms, there are shown in the drawings, and will be described herein in specific detail, embodiments thereof with the understanding that the present disclosure is to be considered as an exemplification of the principles of the invention and is not intended to limit the invention to the specific embodiments illustrated.

Figure 4A:
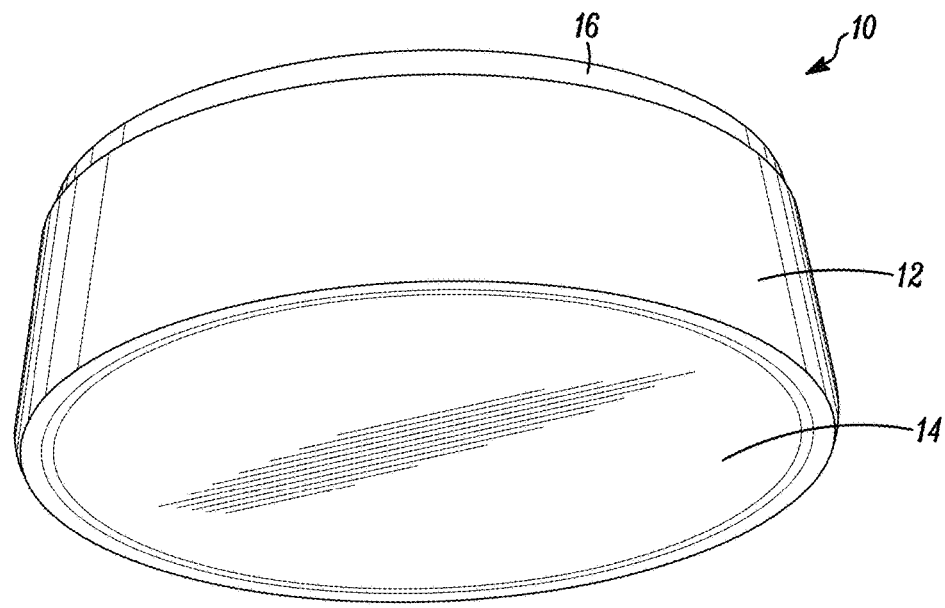
FIG. 4A is a schematic perspective view of an intrusion detector according to an exemplary embodiment.
Figure 4B:
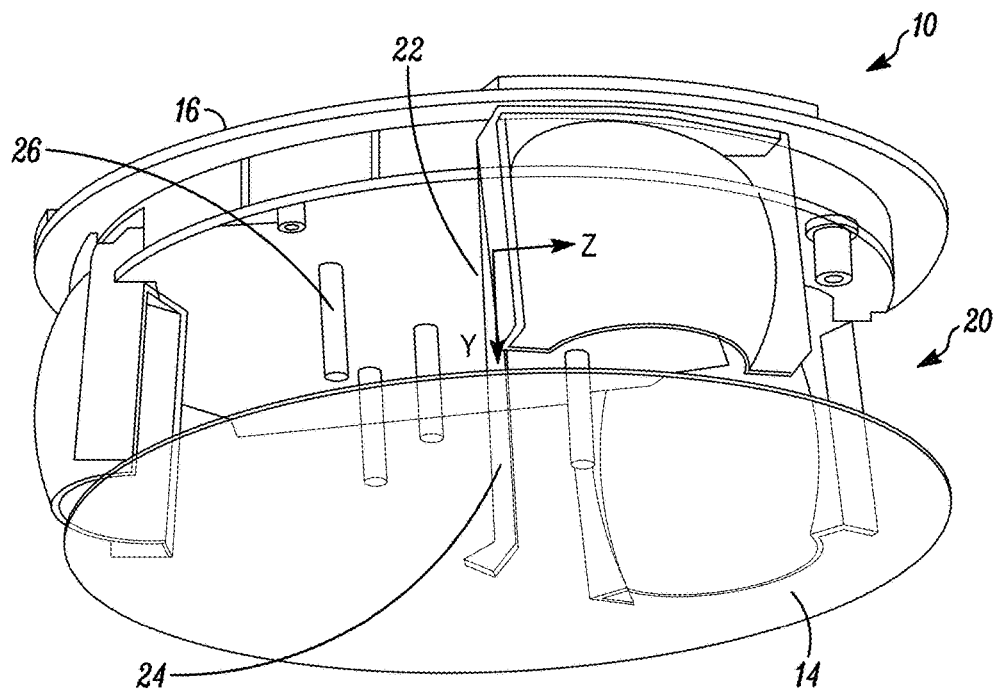
FIG. 4B is a schematic perspective cutaway view of an intrusion detector according to an exemplary embodiment.

With reference now to the figures, FIGS. 4A and 4B illustrate an intrusion detector 10 according to an exemplary embodiment. As shown in FIGS. 4A and 4B, intrusion detector 10 can have an exterior housing 12 including a cover 14. Exterior housing 12 and cover 14 can enclose internal components within an interior area 20 of intrusion detector 10. According to exemplary embodiments, cover 14 can be part of housing 12 or cover 14 and housing 12 can be separate pieces that can be secured together. Housing 12 can include a base 16 configured for securing intrusion detector 10 to a mounting surface such as a ceiling, wall, column, ceiling joist or other structure within or around a building or other location to be monitored such that cover 14 is facing, or is otherwise exposed, to the location or environment to be monitored.

According to the exemplary embodiment illustrated in FIGS. 4A and 4B, intrusion detector 10 is shown as a ceiling-mounted unit with cover 14 oriented along the bottom side of the detector 10 to face downward away from the ceiling. Detector 10 is further shown as having an annular-shaped housing 12 with a circular-shaped cover 14 spanning the interior area of the bottom of detector 10; the housing 12 having a bottom edge forming a border around the outside edge or circumference of cover 14. At least a portion of cover 14 can be comprised of a light-permeable material (e.g. transparent or translucent plastic or glass). It should be recognized that although FIGS. 4A and 4B illustrate one exemplary embodiment for detector 10, detector 10 can be provided in alternate shapes, sizes and configurations without departing from the scope of the subject invention.

As illustrated in FIG. 4B, intrusion detector 10 can have an interior area 20 enclosed within housing 12 between an interior side of cover 14 and an interior side of base 16. As shown schematically in FIG. 4B (together with FIGS. 6A and 7B), interior area 20 of detector 10 can accommodate an artificial or electric light source 22 such as a light-emitting diode (LED) or infra-red LED, a light guide 24 and a light detecting sensor 26. Electric light source 22 and light sensor 24 can be spaced apart from one another at different locations relative the interior side of base 16 and can be oriented such that radiant energy from light source 22 can be directed away from base 16 and toward cover 14, with sensor 26 being configured to detect or sense the radiant energy from light source at a location within the interior area 20.

Electric light source 22 can be an LED, infrared LED or any other device capable of generating radiant energy (e.g. visible light, infrared light, ultraviolet light) without limitation. Sensor 26 can be an electric sensor suitable for detecting radiant energy emitted from light source 22 (e.g. infrared sensor, passive infrared sensor (PIR)) and can be coupled to a printed circuit board (PCB) 28 that can have or be coupled to programmable control circuitry (e.g. a microcontroller having a programmable processor and memory) for generating an output signal in response to detected radiant energy from light source 22. As will be described further herein, such configuration and features can provide an anti-masking device for intrusion detector 10.

As shown schematically in FIG. 4B, light guide 24 can be an elongated structure such as an LED or infra-red LED light tube or light pipe having opposing first and second ends with an elongated body therebetween. The elongated body of light guide 24 can have a substantially hollow interior defined by interior walls and be configured to direct and/or distribute radiant energy between the opposing first and second ends. As shown schematically in FIG. 4B, light guide 24 can be positioned with a first end adjacent to light source 22 and be aligned to extend toward cover 14 with the second end of light guide 24 being opposite light source 22. The elongated body of light guide 24 can have internal walls lined with a reflective or infrared-reflective material or coating to facilitate the distribution of radiant energy emitted from light source 22 from the first end of light guide 24 towards the second end at cover 14 or housing 12.

Light guide 24 can provide a light path directing light from light source 22 outside interior area 20 of detector 10 through cover 14 or housing 12. For example, light guide 24 can extend completely through cover 14 or housing 12 such that the second end of light guide 24 is located externally from cover 14 or housing 12. Alternatively, light guide 24 can extend up to cover 14 or housing 12 and be aligned with a separate member that can extend the light path through cover 14 or housing 12 outside detector 10.

Figure 5A:
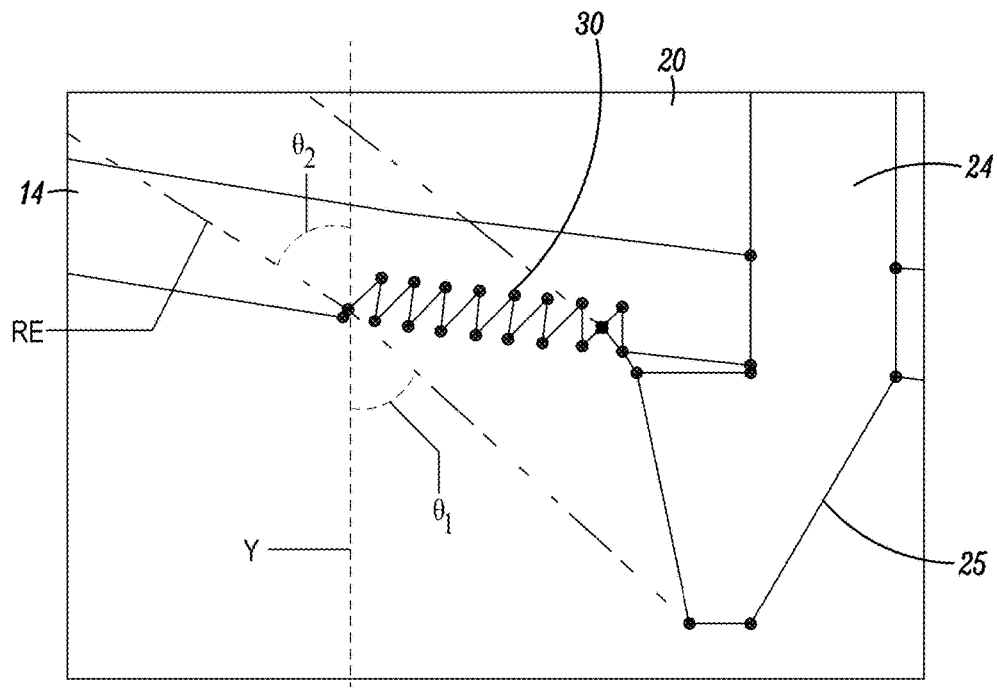
FIG. 5A is a schematic partial side elevation view of a cover for an intrusion detector in an ordinary condition of use according to an exemplary embodiment.
Figure 5B:
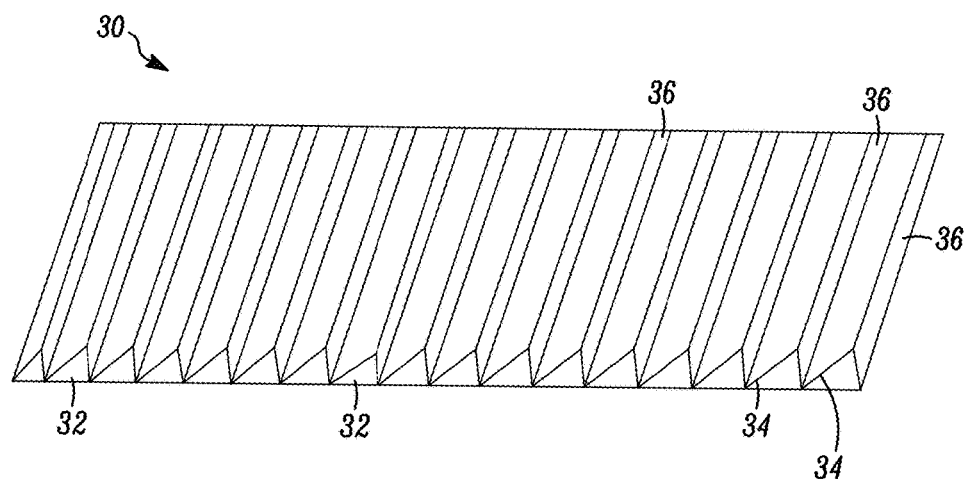
FIG. 5B is a schematic perspective view of a portion of a cover for an intrusion detector according to an exemplary embodiment.

FIG. 5A representationally illustrates a detail view of the second end of light guide 24 together with a portion of the cover 14 according to an exemplary embodiment. According to the exemplary embodiment shown in FIG. 5A, the second end of light guide 24 (or an extension member aligned with light tube 24) can extend outside of interior area 20 of detector by extending through cover 14 to an area adjacent the exterior surface of cover 14. As shown schematically, the second end of light tube 24 (or extension) can be shaped (or can include a bent or curved segment) 25 which can direct radiant energy RE emitted by light source and passing through light guide 24 onto the exterior surface of the cover 14. According to the exemplary embodiment shown in FIG. 5A, a portion of the exterior surface of cover 14 can be provided with a jagged array 30 and upon existing the light tube 24, radiant energy RE can be directed by light tube 24 onto the portion of cover 14 having jagged array 30.

FIG. 5A though 5C illustrate a jagged array 30 provided on the cover 14 according to an exemplary embodiment. As shown, jagged array 30 can be comprised of a plurality of elongated spaced-apart teeth 32 forming a series of alternating channels 34 and projections 36 extending parallel to one another—the alternating series of channels 34 and projections 36 having a generally saw-tooth profile when viewed in cross-section. The jagged array 30 can be set at an incline relative the exterior surface of the cover 14 with projections 36 angled away from light guide 24. According to an exemplary embodiment, the plurality of spaced-apart teeth 32 can have a height on the order of between 0.2 mm and 0.4 mm measured from the bottom of a channel 34 to the peak of an adjacent projection 36.

Figure 5C:
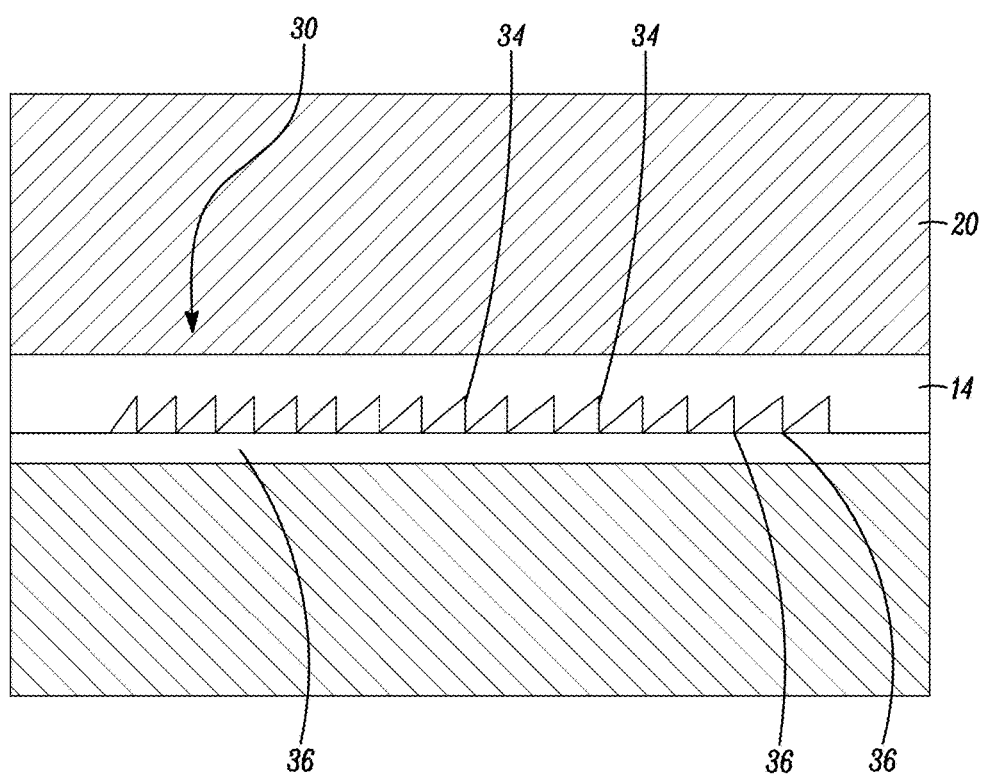
FIG. 5C is a schematic cross-section view of a portion of a cover for an intrusion detector according to an exemplary embodiment.

The portion of cover 14 with the jagged array 30 can be light-permeable and allow radiant energy RE from the light source 22 to pass through the cover 14 back into the interior area 20 of the detector 10. As shown in FIGS. 5A and 5C, cover 14 can have a thickness that is greater than the depth/height of the jagged array 30 such that the jagged array 30 extends partially into the thickness off the cover 14, but does not completely through the width/thickness of cover 14. It is further preferable, but not required, that the light-permeable portion of cover 14, and particularly the jagged array 30 have a generally concave configuration which has shown to better retain a masking substance over a convex configuration.

Figure 6A:
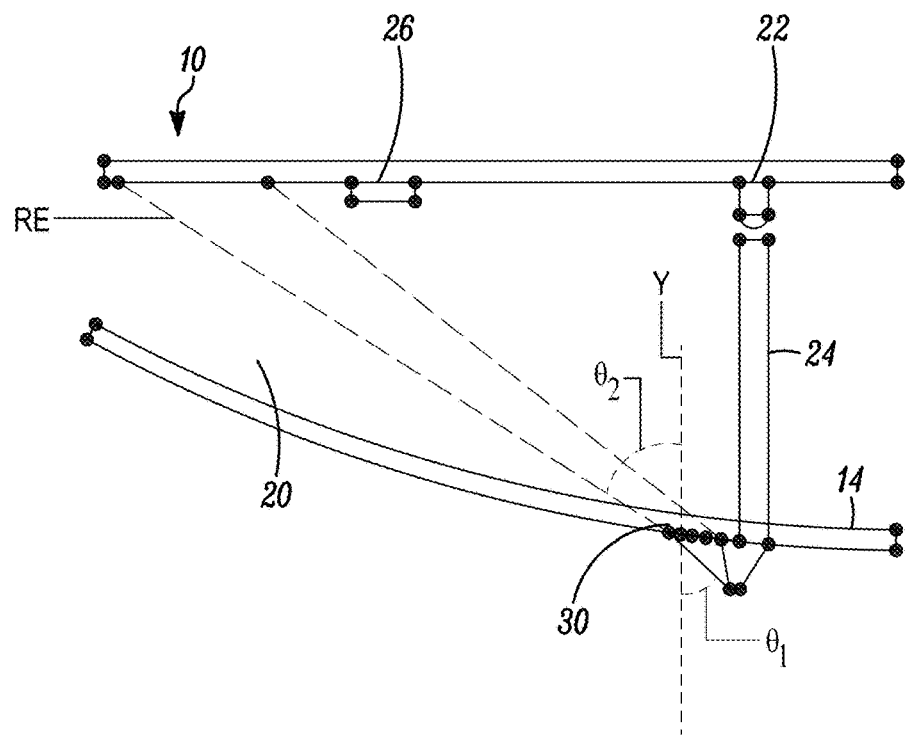
FIG. 6A is a schematic cross-section representational view of an intrusion detector in an ordinary condition of use according to an exemplary embodiment.

As shown in FIGS. 5A and 6A, the light permeable portion of cover 14 with the jagged array 30 can refract radiant energy RE exiting the light tube 24 through the cover 14 and into a location within the interior area 20 of detector 10. FIG. 6A illustrates a detector 10 in an ordinary condition of use according to an exemplary embodiment—(i.e., where the detector 10 is capable of operating according to its intended purpose by monitoring a particular location for an unauthorized security breach). As shown in FIG. 6A, in the ordinary condition of use, radiant energy RE directed onto the jagged array 30 is refracted onto a location in the interior area 20 that is different from the location where the light detecting sensor 26 is positioned. For example, according to the exemplary embodiment of FIG. 6A, jagged array 30 is configured for refracting the radiant energy RE beyond the location where sensor 26 is positioned. In such a condition, radiant energy RE can avoid detection by sensor 26 and detector 10—such condition being associated with a predetermined active/non-alarm state.

Figure 6B:
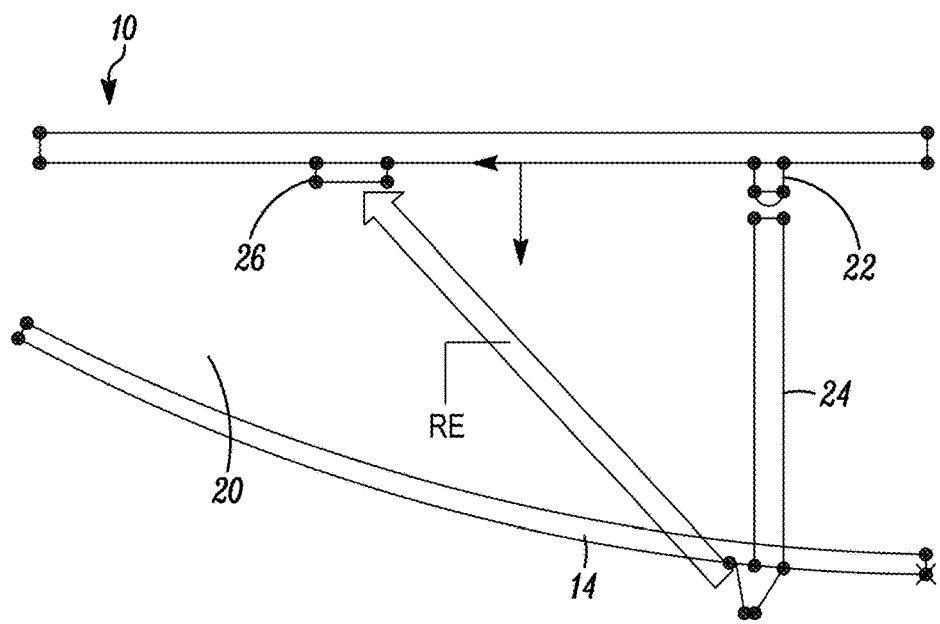
FIG. 6B is a schematic cross-section representational view of an intrusion detector where radiant energy is directed through the cover without being subject to refraction according to an exemplary embodiment.

For comparison purposes, FIG. 6B representatively illustrates radiant energy RE being directed into a detector 10 provided without a jagged array where the radiant energy is not subjected to refraction through cover 14. As indicated in FIGS. 6A and 6B, the location of sensor 26 within detector 10 can correspond to a location where radiant energy RE would be directed without any refraction from jagged array 30. Accordingly, it will be understood that jagged array 30 changes the direction of radiant energy RE into the detector 10 by refracting the radiant energy to a location different from the location where sensor 26 is positioned. In particular, jagged array 30 can provide a refractive index and can cause the direction of radiant energy RE through the cover 14 to deviate from a straight line path through the cover and into the interior 20 if the jagged array was not present. Thus, from FIGS. 6A and 6B, it should be understood that the position/location of sensor 26 within detector 10 can be determined or selected based on the location where radiant energy RE would be propagated if the jagged array was absent.

According to the exemplary embodiment illustrated in FIGS. 5A and 6A, during the ordinary condition of use, radiant energy RE can be directed onto jagged array 30 at an angle of incidence $\theta_1$ relative an imaginary vertical axis Y intersecting the point where the radiant energy RE contacts the jagged array 30. Jagged array 30 can refract the radiant energy RE at an angle of refraction $\theta_2$ relative the imaginary vertical axis. In the embodiment shown schematically in FIG. 6A, the angle of incidence $\theta_1$ is smaller than the angle of refraction $\theta_2$ with the radiant energy RE being directed beyond sensor 22.

Figure 7A:
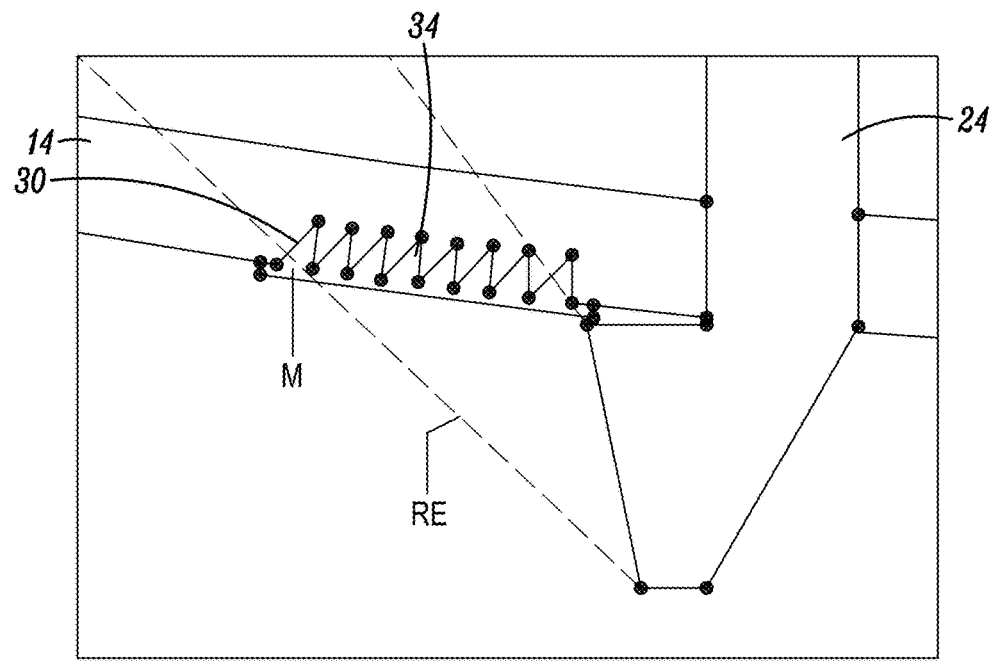
FIG. 7A is a schematic partial cross-section representational view of a portion of a cover for an intrusion detector in a masked state according to an exemplary embodiment.
Figure 7B:
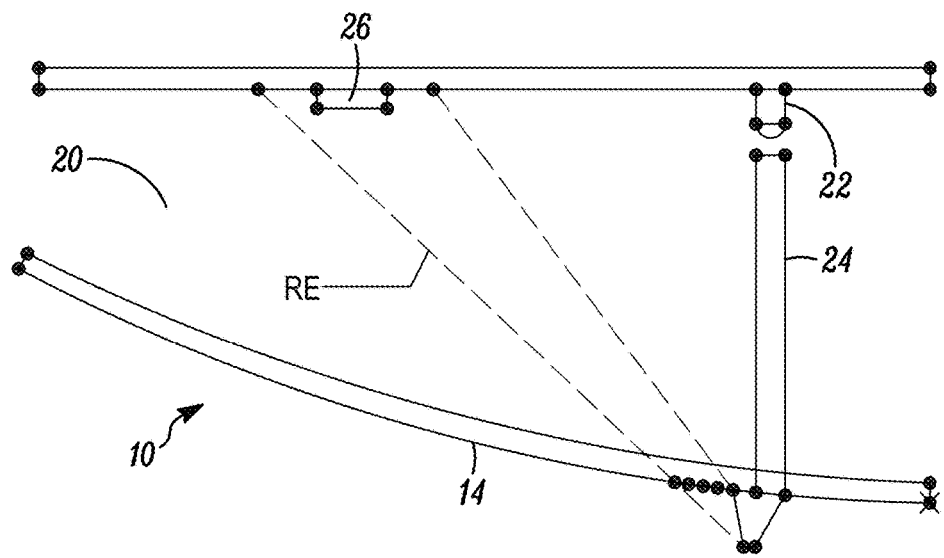
FIG. 7B is a schematic cross-section representational view of an intrusion detector in a masked state according to an exemplary embodiment.

FIGS. 7A and 7B illustrate an exemplary condition where a masking substance M has been applied to cover 14 of detector 10, such as in an effort to blind detector 10. According to the exemplary embodiment shown in FIGS. 7A and 7B, in such a masking event, the making substance M can at least partially fill the channels 34 of the jagged array 30 in the areas between the adjacent projections. As shown in FIGS. 7A and 7B, where masking substance M is received in channels 45, refraction of radiant energy RE through jagged array 30 (as provided in the ordinary condition of use as shown in FIG. 6A) is diminished or altogether eliminated as it passes through cover 14. In other words, the jagged array 30 is configured such that the application of a masking substance M within the channels 34 diminishes the refractive capability of jagged array 30. When this occurs, radiant energy RE passing through cover 14 can be directed/reflected into the interior area 20 of detector 10 in a manner corresponding to the embodiment shown in FIG. 6B (as if the cover 14 was provided without a jagged array).

As shown in FIG. 7B, diminishment or elimination of the refractive capability of jagged array 30 causes the radiant energy RE to be directed onto the location where light sensor 26 is located. The direction of the radiant energy RE onto sensor 26 can result in sensor 26 registering a detection of such energy and generating/triggering an alarm signal to indicate that the detector 10 has been masked.

Figure 8A:
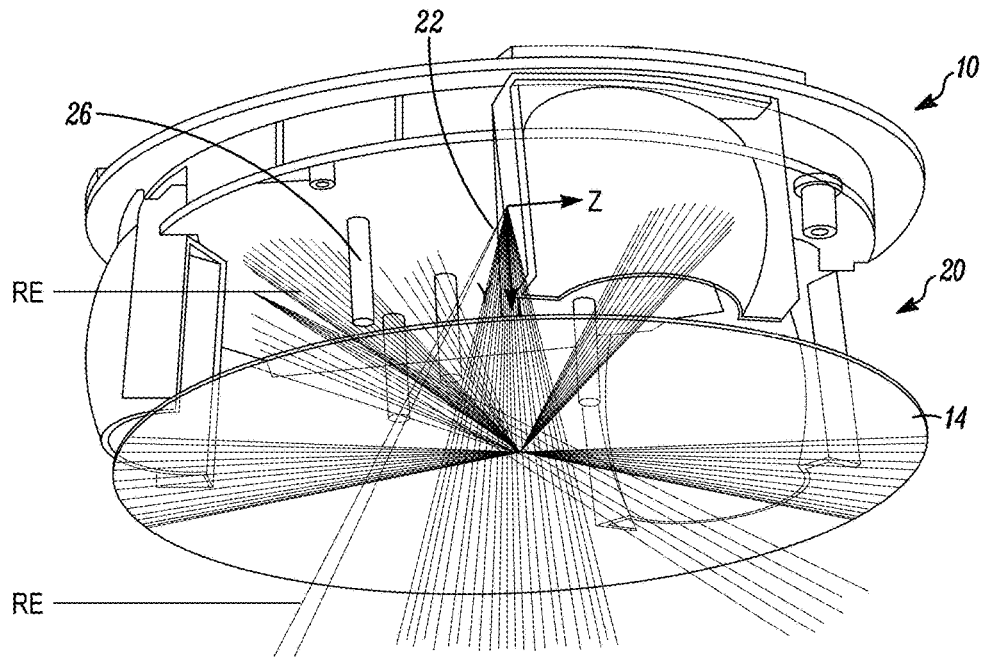
FIG. 8A is a schematic perspective cutaway view of light energy from a simulation of an intrusion detector in an ordinary condition of use according to an exemplary embodiment.
Figure 8B:
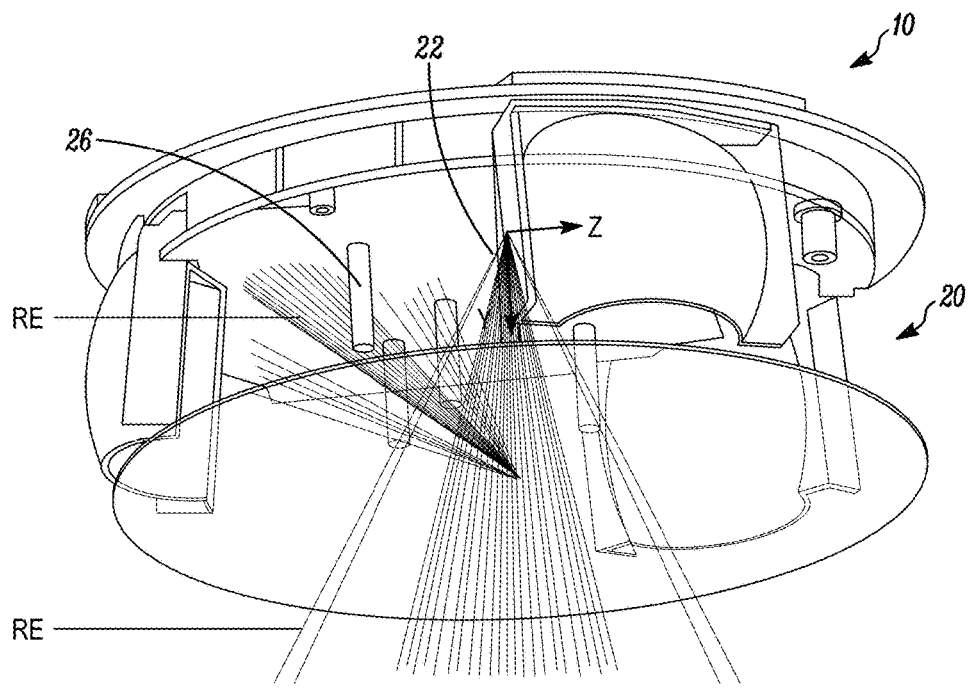
FIG. 8B is a schematic perspective cutaway view of light energy from a simulation of an intrusion detector in a masked state according to an exemplary embodiment.

FIGS. 8A and 8B illustrate the projection of radiant energy RE in simulations for detector 10 according to an exemplary embodiment in both an ordinary condition of use (FIG. 8A) and in a masked state/condition (FIG. 8B) such as when a masking substance has been applied to cover 14 of detector 10. As shown in FIG. 8A, in the ordinary condition of use, radiant energy RE emitted from light source 22 is directed/refracted back into the interior area 20 by the jagged array onto a location where such radiant energy RE avoids detection by sensor 26. Thus, no detection signal is generated by sensor 26 or received by control circuitry.

Conversely, in a masked state/condition as shown representatively in FIG. 8B, radiant energy RE emitted from light source 22 is directed back into the interior area 20 through cover 14, but with diminished refractive capability caused by the masking substance being received within the channels of the jagged array. As shown in FIG. 8B, the diminishment of the refractive capability causes radiant energy RE passed back into interior area 20 change direction from the direction in the ordinary condition of use with the radiant energy RE being directed onto the location where sensor 26 is located. With radiant energy RE now being directed onto sensor 26, the sensor 26 can detect such energy and generate a corresponding alarm signal. FIG. 8B further shows that the application of a masking substance onto the jagged array can have the effect of focusing more of the radiant energy RE back into the detector 10 with less energy being reflected off and across the exterior surface of cover 14 (compare FIG. 8A with FIG. 8B).

Figure 9A:
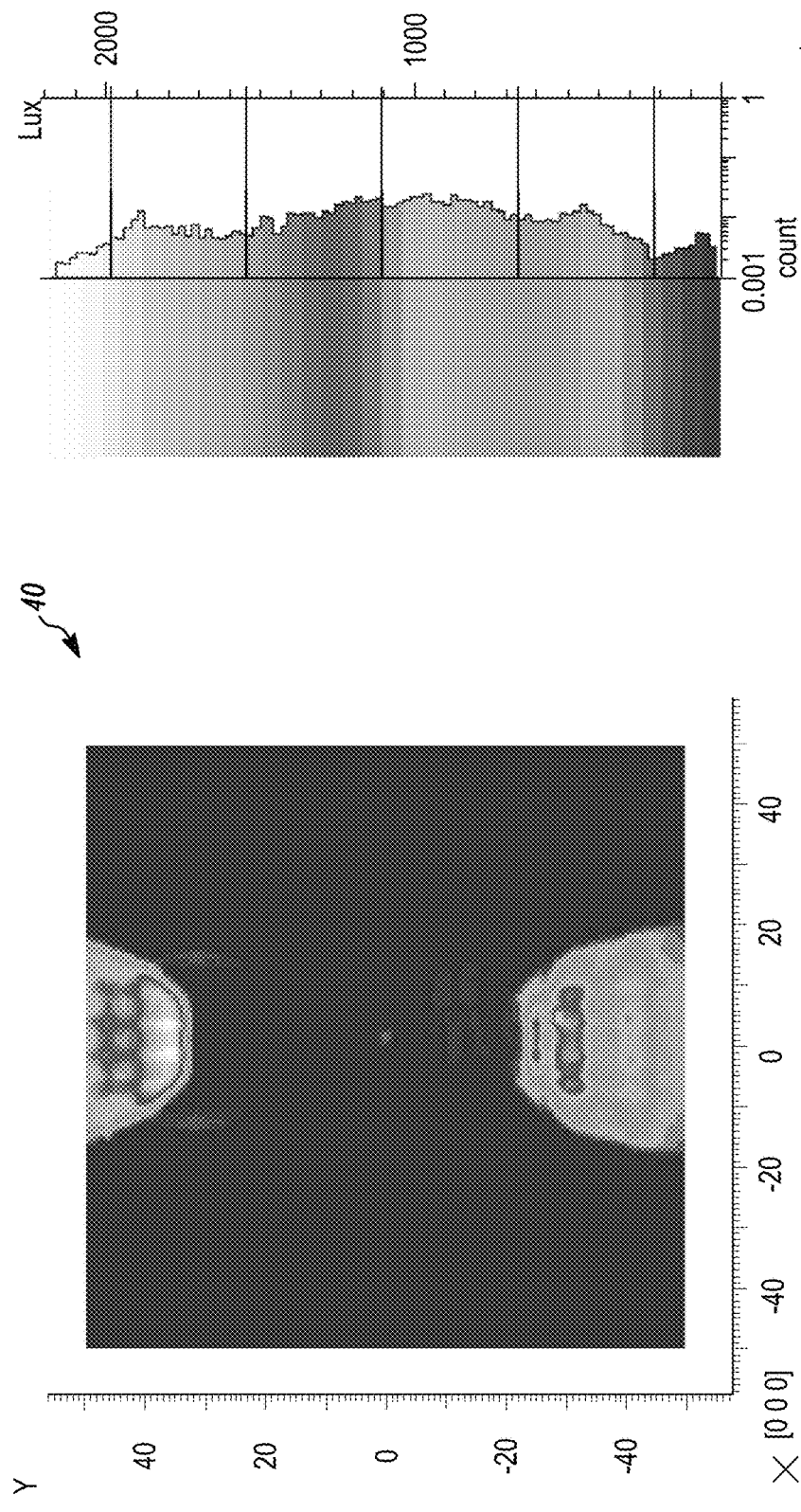
FIG. 9A is a graphical view of a simulation of light energy mapped across a printed circuit board of an intrusion detector in an ordinary condition of use according to an exemplary embodiment.
Figure 9B:
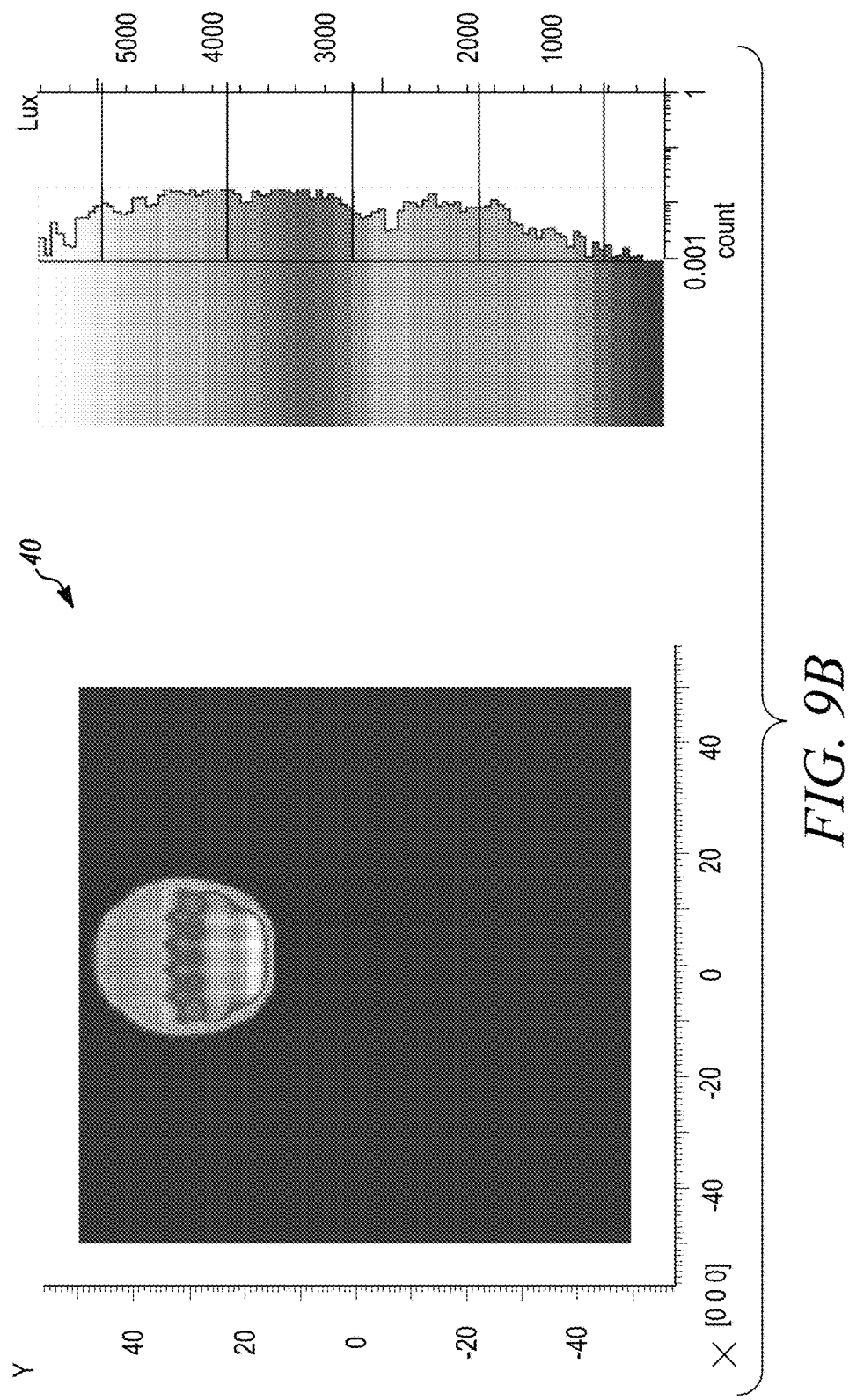
FIG. 9B is a graphical view of a simulation of light energy mapped across a printed circuit board of an intrusion detector in a masked state according to an exemplary embodiment.

FIGS. 9A and 9B are graphical views illustrating maps of the radiant energy (i.e. light energy signatures) 40 from the simulations shown in FIGS. 8A and 8B. In particular, FIG. 9A is a map of the radiant energy signature for detector 10 according to an ordinary condition of use, whereas FIG. 9B is the radiant energy signature for detector 10 in a masked state/condition such as when a masking substance has been applied to the cover of detector. From the simulations shown in FIGS. 9A and 9B, during a normal condition of use (an unmasked state), the sensor can detect almost 0 lux of radiant energy (see FIG. 9A). By contrast, when the detector is masked, the sensor can detect approximately 5000 lux of radiant energy. A 5000-lux difference is significant over simulations performed on know detectors which generally provide a difference of less than 400 lux between the unmasked and masked conditions. Based at least on such results (taken together with the full disclosure provided above), it should be understood and appreciated that embodiments presented herein can provide superior performance, accuracy and reliability over anti-masking devices and techniques employed by known intrusion detector designs. It should additionally be recognized from the foregoing that a detector employing a design as described herein can be efficiently and economically fabricated as compared to known anti-mask units. For example, it will be understood that the design presented herein can be employed with a single sensor and light source and without requiring a separate LED light pipe.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown, or sequential order, to achieve desirable results. Other steps may be provided, or steps may be eliminated, from the described flows, and other components may be add to, or removed from the described embodiments.

What is claimed is:

1. An anti-masking device for an intrusion detector comprising:
   an interior area with an electric light source and a light detecting sensor, the electric light source and light detecting sensor being spaced-apart from one another;
   a cover enclosing at least a portion of the interior area, the cover having a light-permeable area having an exterior surface comprising a jagged array in cross-section, the jagged array having a plurality of parallel spaced-apart teeth forming a series of alternating channels and projections, the light-permeable area of the cover having a thickness and the plurality of spaced-apart teeth having a height, the thickness being greater than the height;
   a light guide having opposing first and second ends and an elongated body therebetween, the first end being located within the interior area adjacent the electric light source, the second end being located outside the internal area and adjacent the exterior surface of the cover,
   wherein the light guide is configured to direct light emitted from the electric light source outside the interior area and onto the jagged array along the exterior surface of the cover, and
   wherein the jagged area is configured to refract the light directed from the light guide through the cover and into the interior area.

2. The anti-masking device of claim 1 wherein during an ordinary condition of use, the light refracted by the jagged area is directed onto a first location within the interior area, the first location being different from a position where the light detecting sensor is located.

3. The anti-masking device of claim 2 wherein during a masking event, the channels of the jagged array are configured for being filled with a masking substance, wherein the light passing though the light-permeable area is redirected from the first location in the interior area to the position where the light detecting sensor is located, an alarm signal being triggered by said redirection of the light onto the light detecting sensor.

4. The anti-masking device of claim 1 wherein the light source is a light emitting diode.

5. The anti-masking device of claim 1 wherein the light detecting sensor is an infrared detector.

6. The anti-masking device of claim 1 wherein the light guide is an LED light pipe.

7. The anti-masking device of claim 1 wherein the light emitted from the light source has a wavelength on the order of between 830 nm to 920 nm, the light being detectable by the light detecting sensor.

8. The anti-masking device of claim 1 wherein the jagged array is set at an incline relative the exterior surface of the cover with the projections angling away from the second end of the light guide.

9. The anti-masking device of claim 1 wherein the device is incorporated with an intrusion detector assembly.

10. The anti-masking device of claim 1 wherein at least some of the plurality of spaced-apart teeth have a height on the order of between 0.2 mm and 0.4 mm measured from a bottom of a first channel to a peak of an adjacent projection.

11. The anti-masking device of claim 2 wherein the light is directed onto the jagged array during the ordinary condition of use is at an angle of incidence relative an imaginary vertical axis intersecting a point where the light contacts the jagged array and the light is refracted by the jagged array at an angle of refraction relative the imaginary vertical axis, the angle of incidence being smaller than the angle of refraction.

12. An intrusion detector comprising:
   a housing configured for securing the intrusion detector to a mounting surface, the housing enclosing an interior area of the intrusion detector, at least a portion of the housing having a light-permeable area, the light-permeable area having an exterior surface comprising a jagged array in cross-section, the jagged array having a plurality of parallel spaced-apart teeth forming a series of alternating channels and projections, the light-permeable area having a thickness and the plurality of spaced-apart teeth having a height, the thickness being greater than the height;
   an intrusion sensor and associated detection circuitry enclosed within the interior area of the housing;
   an electric light source within the interior area of the housing;
   a light detecting sensor within the interior area of the housing in a location separate from the electric light source;
   a light guide having opposing first and second ends and an elongated body therebetween, the first end being located within the interior area adjacent the electric light source, the second end being located outside the internal area and adjacent the exterior surface of the light permeable area, the light guide being configured to direct light emitted from the electric light source outside the interior area and onto the jagged array along the exterior surface of the housing, and wherein
   the jagged area being configured, in an ordinary condition of use, to refract the light directed from the second end of the light guide into a location within the interior area, the location being different from a position where the light detecting sensor is located.

13. The intrusion detector of claim 12 wherein during a masking event, the channels of the jagged array are configured for receiving a masking substance, wherein the light passing though the light-permeable area is redirected from the first location in the interior area to the position where the light detecting sensor is located, an alarm signal being triggered by said redirection of the light onto the light detecting sensor.

14. The intrusion detector of claim 12 wherein the light source is a light emitting diode.

15. The intrusion detector of claim 12 wherein the light detecting sensor is an infrared detector.

16. The intrusion detector of claim 12 wherein the jagged array is set at an incline relative the exterior surface of the cover with the projections angling away from the second end of the light guide.

17. The intrusion detector of claim 12 wherein the light being directed onto the jagged array during the ordinary condition of use is at an angle of incidence relative an imaginary vertical axis which intersects a point where the light contacts the jagged array and the light is refracted by the jagged array at an angle of refraction relative the imaginary vertical axis, the angle of incidence being smaller than the angle of refraction.

18. A method for detecting application of a masking substance on an intrusion detector assembly comprising:
   providing an intrusion detector assembly having a cover enclosing at least a portion of an interior area;
   emitting light from an electric light source affixed to a surface within the interior area, the light being emitted in a direction substantially perpendicular to the surface;
   passing the light emitted from the light source through a light guide having an end opposite the light source, the end of the light guide being outside the interior area;
   directing the light from the end of the light guide onto a light-permeable area of the cover, the light-permeable area comprising an external surface having a jagged array in cross-section having a plurality of parallel spaced-apart teeth forming a series of alternating channels and projections, the light-permeable area having a thickness and the plurality of spaced-apart teeth having a height, the thickness being greater than the height;
   passing the light through the light-permeable area of the cover into the interior area of the detector assembly, the light being refracted by the jagged array onto at a first location within the interior area;
   receiving the masking substance on the light-permeable area of the cover, the masking substance filling at least a portion of the channels of the jagged array and eliminating refraction of the light by the jagged array;
   redirecting the light passing through the light-permeable area from the first location to a second location having a light detecting sensor;
   detecting the light at the light detecting sensor, and triggering an alarm signal.

* * * * *